(12) United States Patent
Bornard et al.

(10) Patent No.: US 10,400,740 B2
(45) Date of Patent: Sep. 3, 2019

(54) ROTATING PART OF A HYDRAULIC MACHINE, HYDRAULIC MACHINE PROVIDED WITH SUCH A ROTATING PART AND INSTALLATION FOR CONVERTING ENERGY COMPRISING SUCH A MACHINE

(71) Applicant: ALSTOM Renewable Technologies, Grenoble (FR)

(72) Inventors: Laurent Bornard, Saint-Ours (CA); Michel Sabourin, Sorel-Tracy (CA)

(73) Assignee: GE RENEWABLE TECHNOLOGIES, Grenoble (FR)

( * ) Notice: Subject to any disclaimer, the term of this patent is extended or adjusted under 35 U.S.C. 154(b) by 266 days.

(21) Appl. No.: 14/952,274

(22) Filed: Nov. 25, 2015

(65) Prior Publication Data

US 2016/0076508 A1 Mar. 17, 2016

Related U.S. Application Data

(63) Continuation of application No. PCT/EP2014/060207, filed on May 19, 2014.

(30) Foreign Application Priority Data

May 27, 2013 (FR) ...................................... 13 54771

(51) Int. Cl.
  *F03B 3/02* (2006.01)
  *F03B 3/04* (2006.01)
  *F03B 3/12* (2006.01)

(52) U.S. Cl.
  CPC ................ *F03B 3/121* (2013.01); *F03B 3/02* (2013.01); *F03B 3/04* (2013.01); *F05B 2240/31* (2013.01);

(Continued)

(58) Field of Classification Search
  CPC .. F03B 3/12; F03B 3/121; F03B 3/123; F03B 3/14; F03B 3/02; F03B 3/04; F03B 3/125;

(Continued)

(56) References Cited

U.S. PATENT DOCUMENTS 7,220,106 B2   5/2007  Paquet et al.
2005/0271508 A1  12/2005  Beyene et al.
(Continued)

FOREIGN PATENT DOCUMENTS

CN    1530538 A    9/2004
CN    1682030 A    10/2005
(Continued)

OTHER PUBLICATIONS

Unofficial English Translation of Chinese Office Action issued in connection with corresponding CN Application No. 201480030984.6 dated Mar. 21, 2017.

(Continued)

*Primary Examiner* — Richard A Edgar
*Assistant Examiner* — Elton K Wong
(74) *Attorney, Agent, or Firm* — Dority & Manning, P.A.

(57) ABSTRACT

When traversed by a flow of water, a hydraulic machine rotating part rotates around an axis of rotation. It includes runners which are distributed around the axis of rotation and each extend between a leading edge and a trailing edge. Each runner can include a first part which defines its leading edge and a second part which is attached to the first part and defines the trailing edge at least in part. The second part can be elastically deformable or displaceable in a reversible manner with respect to the first part, under the action of the flow of water, the second part defining, when the machine operates, the direction of the flow of water downstream of the runner.

13 Claims, 10 Drawing Sheets

(52) U.S. Cl.
CPC ....... *F05B 2240/311* (2013.01); *Y02E 10/223* (2013.01)

(58) Field of Classification Search
CPC ............ F05B 2240/31; F05B 2240/311; Y02E 10/223
See application file for complete search history.

(56) References Cited

U.S. PATENT DOCUMENTS

| | | | |
|---|---|---|---|
| 2009/0047131 A1* | 2/2009 | Neumann ................ | F03B 3/121 416/132 R |
| 2012/0141274 A1* | 6/2012 | Wilson .................. | F03D 1/0641 416/44 |

FOREIGN PATENT DOCUMENTS

| | | |
|---|---|---|
| DE | 10 2010 011 708 A1 | 9/2011 |
| JP | 58-148281 U | 10/1983 |
| JP | 2012-172556 A | 9/2012 |
| RU | 2 141 059 C1 | 11/1999 |
| RU | 2 148 183 C1 | 4/2000 |
| WO | WO 2011/113424 A2 | 9/2011 |

OTHER PUBLICATIONS

International Search Report (PCT/ISA/210) dated Sep. 29, 2014, by the European Patent Office as the International Searching Authority for International Application No. PCT/EP2014/060207.
Written Opinion (PCT/ISA/237) dated Sep. 29, 2014, by the European Patent Office as the International Searching Authority for International Application No. PCT/EP2014/060207.
French Search Report for FR 1354771 dated Feb. 10, 2014.
Office Action and Search issued in connection with corresponding RU Application No. 2015155712 dated Jan. 16, 2018.

* cited by examiner

ROTATING PART OF A HYDRAULIC MACHINE, HYDRAULIC MACHINE PROVIDED WITH SUCH A ROTATING PART AND INSTALLATION FOR CONVERTING ENERGY COMPRISING SUCH A MACHINE

RELATED APPLICATION(S)

This application claims priority as a continuation application under 35 U.S.C. § 120 to PCT/EP2014/060207 filed as an International Application on May 19, 2014 designating the U.S., and which claims priority to French Application 1354771 in France on May 27, 2013. The entire contents of these applications are hereby incorporated by reference in their entireties.

FIELD

This disclosure concerns a rotating part associated with a hydraulic machine, a hydraulic machine and an installation for converting energy having such a machine.

BACKGROUND INFORMATION

In the area of the conversion of hydraulic energy into mechanical or electric energy, using a hydraulic machine such as a turbine, pump or Francis-type turbo-pump is known. In turbine mode, the hydraulic machine rotatingly drives a shaft thus transforming hydraulic energy into mechanical energy. The conversion of energy is realized by a wheel which forms a rotating part and includes runners which can be distributed around the axis of rotation of the wheel. The runners extend between a first edge and a second edge which are respectively, during operation, a leading edge and a trailing edge for the flow of water.

One of the challenges persisting in a Francis turbine is the research into the best quality of flow possible downstream of the rotating part. For example, it is important to be able to master the distribution of velocities of the flow leaving the wheel, to avoid cavitation phenomena or also to preserve the stability of the flow, that is to say to avoid the formation of turbulences or vortices.

To do this, a wheel with non-movable runners can have an optimum operating flow rate for which the direction of the water leaving the trailing edge of the runners is relatively parallel to the axis of rotation of the wheel with a relatively uniform distribution of output velocity. In such a configuration, the direction of the water leaving the trailing edge can have a limited rotational component, and the nature of the flow allows harmful phenomena such a vortex to be avoided within the intake duct.

On the other hand, for a flow rate that is different from the optimum operating flow rate, the rotation of the wheel causes the water, leaving the trailing edge, to have a direction which is deflected with respect to the axis of rotation of the wheel and at the same time there is deterioration in the uniformity of the output velocities. Thus, the flow leaving the wheel is of a lesser quality and is even more likely to give rise to an increase in losses, vortices and instabilities.

Similar issues arise with other types of turbines, notably for propeller-type turbines.

In order to address this issue, it is known to use controlled mechanisms to displace the runners of the Kaplan, Bulbe or Deriaz turbines according to the turbine flow rate so as to maintain a good quality of flow downstream of the wheel. However, such mechanisms increase the end cost of the turbine and their use is limited to restricted heights of head applied to turbines.

SUMMARY

A rotating part of a hydraulic machine is disclosed which, when it is traversed by a flow of water, rotates around an axis of rotation and which comprises: runners which are distributed around the axis of rotation and each extend between a leading edge and a trailing edge, wherein each runner includes: a first part which defines its leading edge; and a second part which is attached to the first part and defines its trailing edge at least in part, the second part being elastically deformable or displaceable in a reversible manner with respect to the first part, under the action of the flow of water, said second part defining, when the machine operates, the direction of flow of water downstream of the runner.

BRIEF DESCRIPTION OF THE DRAWINGS

Features of the invention will be better understood and other advantages of the same will appear more clearly in light of the description which will follow regarding embodiments of a rotating part which is associated with a hydraulic machine, given by way of example and referring to the accompanying drawings in which.

DETAILED DESCRIPTION

The present disclosure proposes a hydraulic machine which allows the quality of the flow leaving the wheel to be improved over a wider range of flow rates.

To this end, the rotating part of a hydraulic machine is disclosed which, when it is traversed by a flow of water, rotates around an axis of rotation and which includes runners which can be distributed around the axis of rotation and each extend between a leading edge and a trailing edge. According to the exemplary embodiment, each runner of the rotating part includes a first part which defines its leading edge and a second part which is attached to the first part and defines its trailing edge at least in part, whilst the second part is elastically deformable or displaceable in a reversible manner with respect to the first part, under the action of the flow of water, the second part defining, when the machine operates, the direction of the flow of water downstream of the runner.

The runners can be deformed according to the flow rate of incoming water, in order to direct the water leaving the trailing edge along an adapted direction which optimizes the quality of the flow leaving the wheel.

According to advantageous but not obligatory aspects, a rotating part associated with a hydraulic machine can incorporate one or several of the following characteristics, taken in all combinations that can be technically admissible:

The part includes a connecting member between the runners and a shaft which defines the axis of rotation of the rotating part, whilst the first part of each runner is integral with the connecting member and the second part of each runner is not integral with the connecting member.

The second part of the runner is fixed on the first part and is realized in an elastically deformable material, the modulus of elasticity of which is less that that of the material making up the first part.

In an exemplary embodiment, the second part of the runner is formed by a core in a rigid material which is monobloc with the first part and by a covering which is realized in an elastically deformable material, the modulus of elasticity of which is less than that of the material making up the first part.

In an exemplary variant, the second part of the runner is formed by a profile in resin which is fixed to the first part and by a shell in composite material.

In an exemplary variant, the second part of the runner is mounted in an articulated manner on the first part. In this case, the runner includes in an advantageous manner means for elastically returning the second part to a predetermined position.

The second part extends over about a third of the length of the runner, measured between the leading edge and the trailing edge.

The second part defines the trailing edge completely.

As a variant, the first part defines a first portion of the trailing edge and the second part defines a second portion of the trailing edge.

The second part of the runner is formed by several separate elements which can be elastically deformable or displaceable independently of one another with respect to the first part.

The length of the second part measured between its area of attachment to the first part and the trailing edge is variable along the trailing edge.

When the machine operates, the second part directs the flow of water along a more favorable direction which can be made up of a reduction in the rotational component so as make the flow overall more parallel to the axis of rotation of the rotating part.

The rotating part is a Francis turbine wheel which includes a crown and a band between which the runners extend, the first part of each runner being fixed to the crown and to the band, whilst the second part is or is not fixed to the crown or to the band.

As a variant, the rotating part is associated with a propeller-type, Bulb-type, Kaplan-type or Deriaz-type turbine and includes a hub and runners which extend, radially with respect to the axis of rotation, from the hub, whilst the first part of each runner is mounted on the hub and the second part of each runner is or is not fixed on the hub.

A hydraulic machine is also disclosed which includes a rotating part as defined previously.

An installation is also disclosed for converting hydraulic energy into electric energy or mechanical energy which includes a hydraulic machine such as defined previously.

Figure 1:
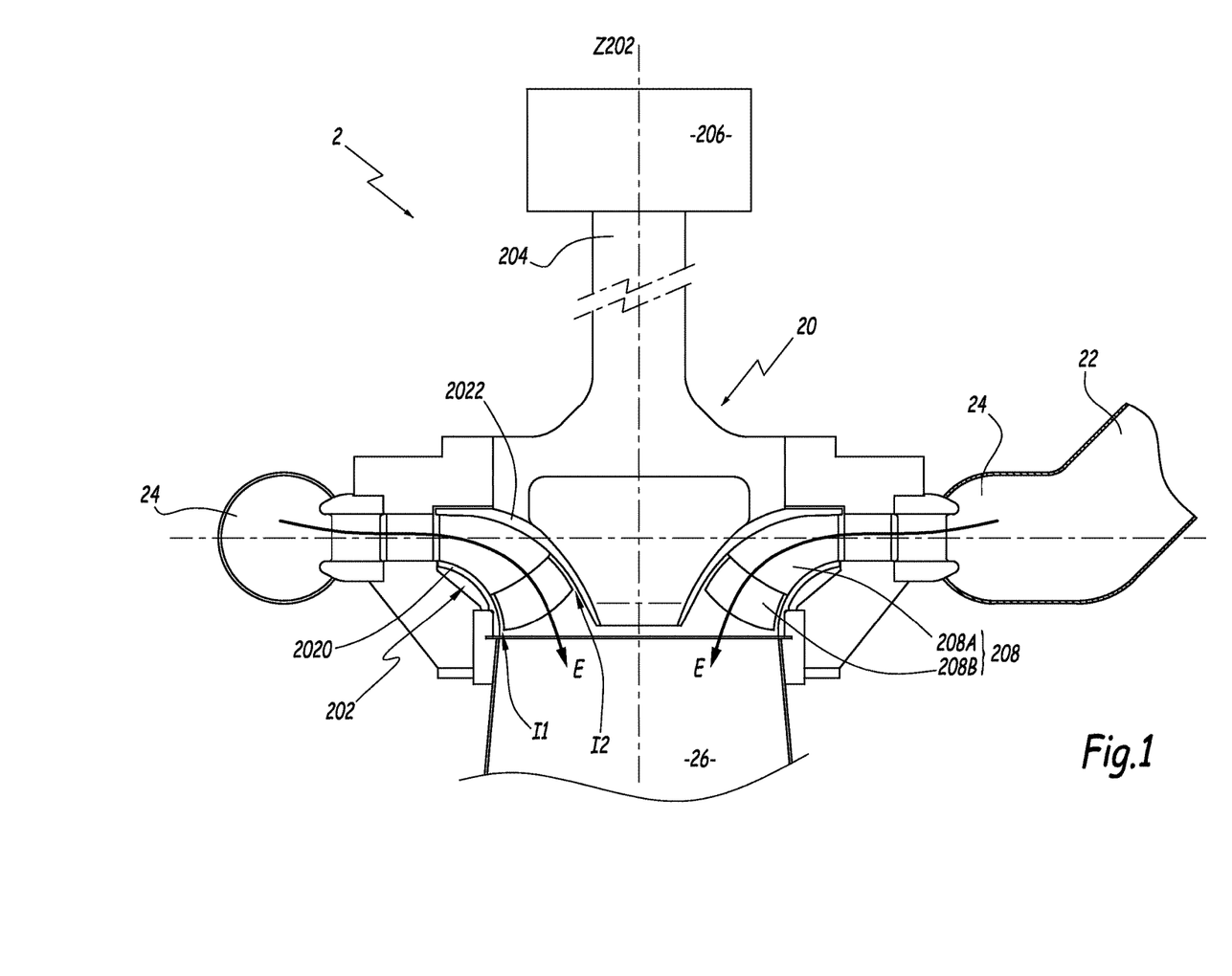
FIG. 1 is a basic axial section of an installation for converting energy according to an exemplary embodiment, incorporating a Francis turbine also according to the present disclosure.

FIG. 1 shows an installation for converting energy 2 according to an exemplary embodiment. The installation for converting energy 2 includes a hydraulic machine 20 which, in the example, is a Francis turbine. Thus, the rotating part of the turbine 20 is a Francis-type wheel 202. The wheel 202 rotates around a vertical axis Z202 and rotatingly drives a drive shaft 204. In the present case, the drive shaft 204 is connected to an alternator 206 so as to produce electricity. The water is stored upstream in a volume of water not shown. It is then conveyed up to the hydraulic turbine 20 by means of a penstock 22 with a head height that is defined by the difference in altitude between the volume of water and the turbine 20. The penstock 22 opens out into a tank 24 which surrounds the wheel 202 and which allows the water to be distributed in an appreciably regular manner around the axis Z202 inside the wheel 202. More precisely, the water circulates between the runners 208 which can be arranged between a crown 2022 and a band 2020 of the wheel 202. The runners 208 can each include a leading edge 2080 against which the water arrives from the tank 24 and a trailing edge 2082 from which the water escapes to an intake duct 26. The runners 208 have an asymmetrical profile, with a lower surface 2084 and an upper surface 2086. The direction the water circulates through the turbine 20 is shown, in FIG. 1, by the arrows E.

Figure 2:
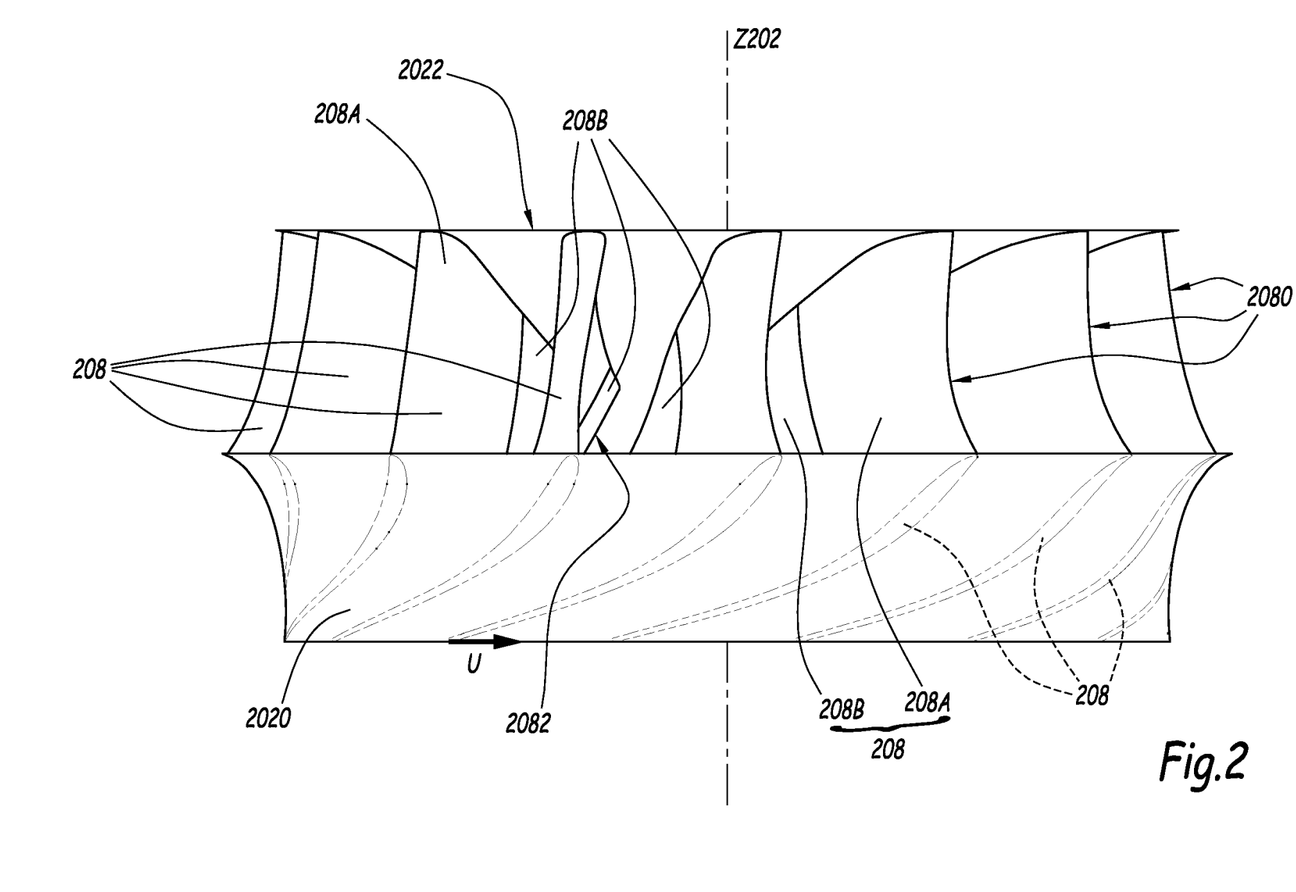
FIG. 2 is a side view of a wheel of the turbine of FIG. 1.

FIG. 2 shows just the wheel 202 according to an exemplary embodiment. When the wheel is observed from above in FIG. 2, it rotates around the axis Z202 in an anticlockwise manner. The movement of rotation is shown in FIG. 2 by a vector $\vec{U}$ which is ortho-radial to the axis of rotation Z202 of the wheel and which is oriented from left to right in FIG. 2. In the case shown of a synchronous industrial machine, the velocity of rotation $\vec{U}$ of the wheel 202 is constant whatever the operating conditions. In fact, the velocity of rotation of the wheel 202 is imposed by the frequency of the network to which the installation 2 is connected. The industrial machine could also be variable velocity.

The profile of the runners 208 shown in dotted lines can be seen in FIG. 2 on the band 2020.

The runners 208 of the wheel 202 can be formed in two parts. A first part 208A defines the leading edge 2080 of each runner and a second part 208B defines its trailing edge 2082 and is attached to the first part 208A. As can be better seen in FIG. 1, the first part 208A of the runner 208 is fixed to the crown 2022 and to the band 2020 whilst the second part 208B is not fixed to the crown 2022 or to the band 2020, allowing an interstice I1 to remain between the part 208B and the band 2020 and an interstice I2 between the part 208B and the crown 2022. The size of the interstices I1 and I2 is exaggerated in FIG. 1 in order to facilitate the visualization thereof.

Figure 13:
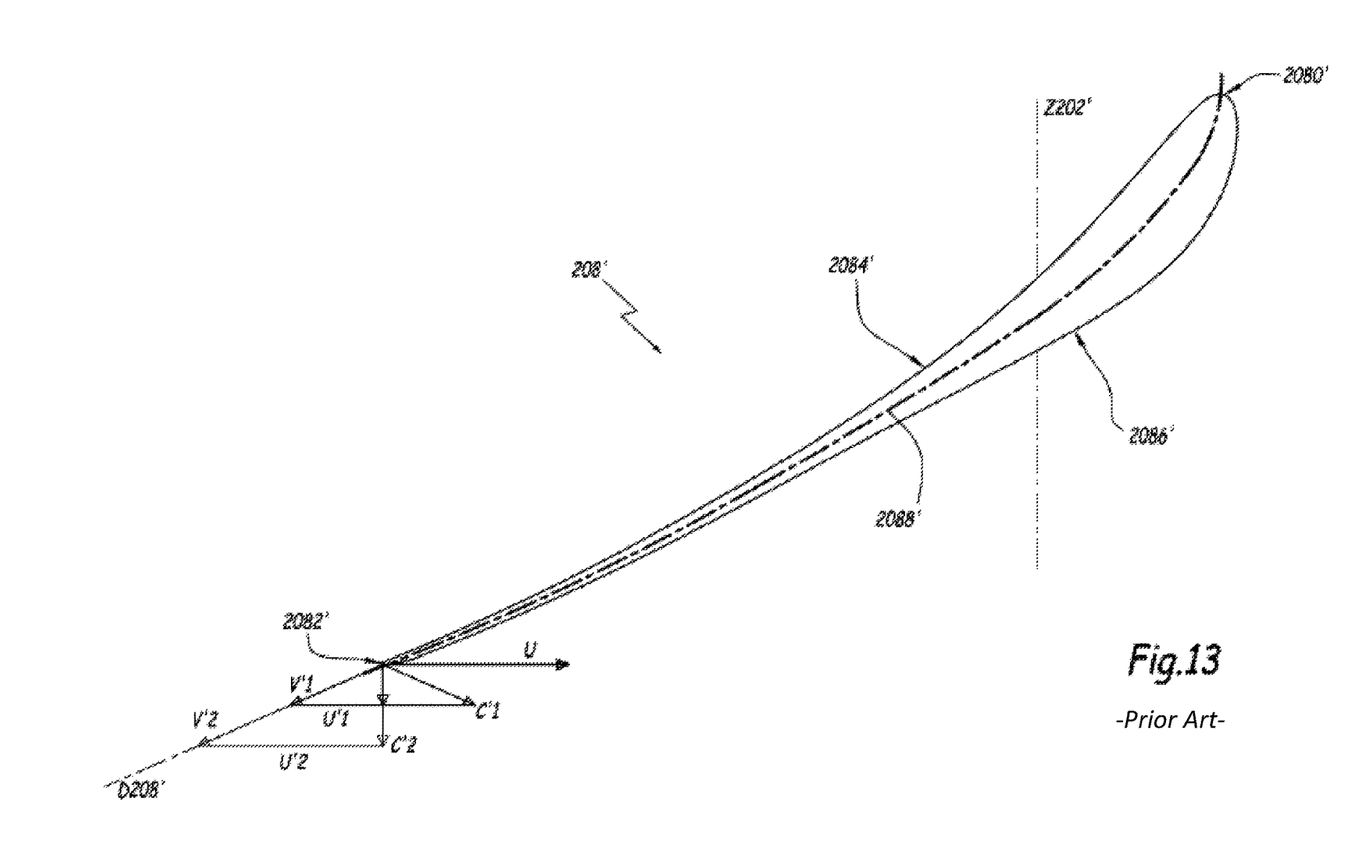
FIG. 13 is a view similar to FIG. 4, of a runner which is associated with a wheel.

FIG. 13 shows the section of a runner 208' which is associated with a wheel of the prior art. The lower surface and the upper surface respectively 2084' and 2086' of the runner 208' can be seen along with its leading edge and its trailing edge 2080' and 2082' respectively. At present the flow leaving the trailing edge 2082' of the runner 208' is the interesting point as this can be transposed to other runners 208' of the wheel.

In a known manner, in a rotating datum-point linked to the wheel, the water flows tangentially to the lower surface 2084' and to the upper surface 2086', along the profile of the runner. More precisely, a chord 2088' is defined as a line that is equidistant from the lower surface 2084' and from the upper surface 2086'. The chord 2088' goes through the leading edge 2080' and through the trailing edge 2082'. Thus, the upper edge 2086' and the lower edge 2082' converge on the chord 2088'. In the first instance, the chord 2088', in its extension of the trailing edge 2082, defines the direction D208' of flow of the water leaving the runner 208. A velocity vector $\overrightarrow{V'2}$ is defined which shows the velocity of the water in a relative datum-point linked to the wheel and which is obtained for a flow having an optimum operating flow rate. The vector $\overrightarrow{V'2}$ extends along the direction of flow D208'.

In an absolute datum-point, that is to say which does not rotate at the same time as the wheel, the water further includes a rotational component $\overrightarrow{U}$ that is created by the rotation of the wheel. In the configuration of an optimum operating flow rate, the sum of the vector $\overrightarrow{V'2}$ and of the vector U gives a vector $\overrightarrow{C'2}$ which is principally output, that is to say which is oriented parallel to an axis Z202' of rotation of the wheel, and is directed downward, in the direction of the intake duct 26. The result comes from the fact that the velocity $\overrightarrow{V'2}$ leaving the runner 208 can have a rotational component $\overrightarrow{U}'2$ which is directly opposed to the velocity $\overrightarrow{U}$ of rotation of the wheel. Thus, the water circulating between the runners 208' falls vertically directly into the intake duct 26. The risk of a vortex appearing is therefore limited and the flow leaving the wheel is more stable.

On the other hand, for a flow rate that is different from the optimum operating flow rate, for example, equal to half the optimum operating flow rate, the tangential velocity leaving the runner, called $\overrightarrow{V'1}$, is two times less than the velocity obtained for an optimum operating flow rate. As a result, when the velocity vector $\overrightarrow{V'1}$ is added to the velocity vector $\overrightarrow{U}$ which is linked to the rotation of the wheel, the result is a velocity vector $\overrightarrow{C'1}$ which is not parallel to the axis of rotation Z202' of the wheel. In fact, the velocity $\overrightarrow{V'1}$ can have a rotational component $\overrightarrow{U'1}$ which is not large enough to compensate for the velocity $\overrightarrow{U}$ of ration of the wheel. Thus, the fluid, leaving the runners 208' of the wheel, is made to rotate around the axis of rotation Z202'. The rotation can bring about the appearance of vortices, increase turbine losses and damage the overall quality of the flow leaving the wheel.

Following the description details of the operating of one single runner 208 of the wheel 202 according to exemplary embodiments, are given as this can be transposed to the other runners of the wheel 202. The runner, which is shown on its own in FIGS. 3 and 4, differs from that in FIG. 13 in that it is realized in two different materials. In fact, the first part 208A is realized in a rigid material, such as steel, and the second part 208B is realized in a material that is elastically deformable within the range of the water pressure traversing the wheel 202. This can be a composite material, notably polyester and carbon fiber-based. The first part 208A and the second part 208B can be soldered together along an attachment area Z208. A chord of the runner 208 is given the reference 2088. The chord 2088 is equidistant from the lower surface 2084 and from the upper surface 2086 of the runner 208 and extends from its leading edge 2080 to its trailing edge 2082. Thus, the lower surface 2084 and the upper surface 2086 converge on the chord 2088. The length of the chord 2088 is given the reference L208, the length L208 can be interpreted as the length of the runner 208 when seen through the flow. The length L208 can vary over the height of the runner 208, between the band 2020 and the crown 2022. In the case shown, the first part 208A extends over about two thirds of the length L208 of the runner and the second part 208B extends over about one third of the length of the runner 208. The proportions can differ over the height of the runner 208, between the band 2020 and the crown 2022.

Figure 4:
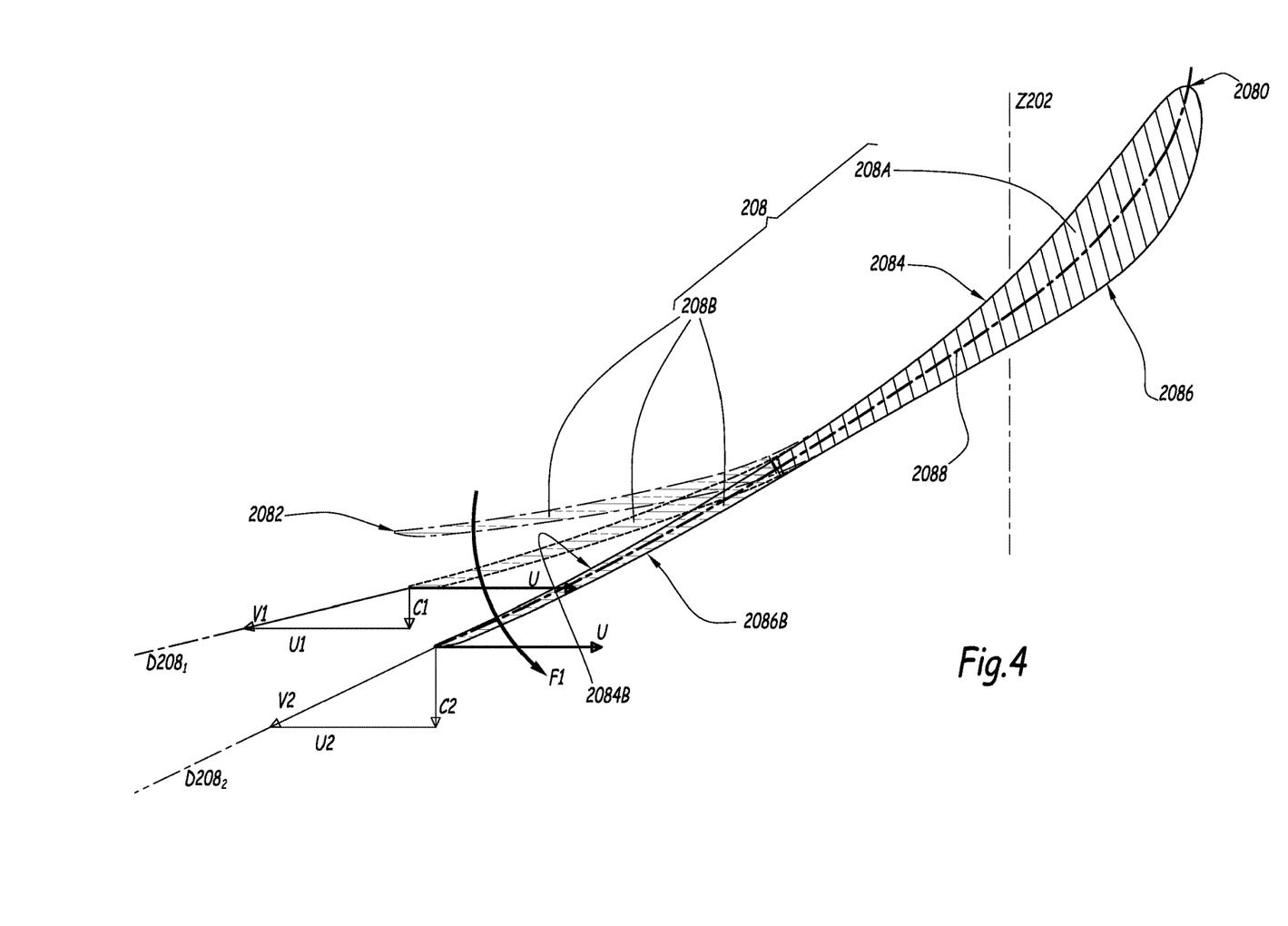
FIG. 4 is a section of the runner of FIG. 3 shown in different configurations of use.

FIG. 4 shows three operating configurations of the runner 208. It is noted in the figure that the part 208B deforms elastically according to the hydraulic pressure which is exerted on the runner 208. A first configuration, shown in broken-section lines at the top of FIG. 4, is a position for which the runner is at rest, that is to say when there is no flow traversing the turbine. A second configuration, shown below the first configuration and in dotted lines in FIG. 4, is a configuration for which the turbine is traversed by a flow rate that is less than the optimum operating flow rate, notably two times less than the optimum operating flow rate. A third configuration, shown in solid lines in FIG. 4, is a configuration for which the turbine is traversed by a flow having an optimum operating flow rate. In the second and third configurations, the runner 208 is deformed by the hydraulic pressure. It is noted that the third position corresponds to the rigid form of the runner 208' from the prior art shown in FIG. 13.

For the clarity of the drawing, the chord 2088 is only shown in the third configuration in FIG. 4.

When the turbine 20 is fed, the second part 208B is deformed elastically following a rotational movement with respect to the first part 208A. The movement is shown in FIG. 4 by an arrow F1. For example, if the flow rate applied is the optimum operating flow rate, the second part 208B of the runner 208 goes from the first to the third configuration.

When the flow rate reduces, the part 208B of the runner 208 is displaced as a result of the effect of the material making up the part 208B elastically recovering its shape in the direction opposite the arrow F1. There is therefore reversible deformation. For example, if the wish is to operate the turbine at a flow rate that is two times less than the optimum operating flow rate, the second part 208B of the runner 208 goes from the third to the second configuration. This is the to be a passive system as the form of the runner adapts automatically according to the feed flow rate of the turbine 20 without any outside intervention. When the operating of the turbine is stopped, the second part 208B returns into its first position. The first position is therefore a predetermined position of the runner 208 when the turbine is not operating.

Only three configurations can be shown in FIG. 4. However, other configurations can be possible as the geometry of the runner 208 depends on the flow rate coming into the turbine. In fact, at a flow rate that is between half the optimum operating flow rate and the optimum operating flow rate inclusive, the second part 208B of the runner 208 could then be arranged between the second and the third configuration. Whilst for a flow rate in excess of the optimum flow rate, the geometry 208B could take up a deformed position which could go beyond the third configuration in the direction of the arrow F1.

Furthermore, the second part 208B of the runner is deformed such that the rotational component, that is to say the component which is ortho-radial to the axis of rotation Z202 of the wheel 202, of the tangential velocity of the flow S' opposes the velocity of rotation of the wheel overall.

The velocity of the flow for the second configuration in a datum-point linked to the wheel is noted as $\vec{V1}$. The velocity vector $\vec{V1}$ is overall tangential to the profile of the runner at the trailing edge 2082 and is oriented along the direction of flow 208 defined by the rectilinear extension of the chord 2088. The second part 208B of the runner can have a different position compared to the runner 208' of a wheel of the prior art, the vector $\vec{V1}$ is therefore oriented differently compared to the vector $\vec{V'1}$. The extension of the chord 2088 downstream of the trailing edge when the runner is in its second position defines the direction $D208_1$ which is different from the direction D208'. In fact, the vector $\vec{V1}$ includes a vertical component $\vec{C1}$ parallel to the axis of rotation Z202 and a rotational component $\vec{U1}$ which is ortho-radial to the axis Z202. In the configuration, the component $\vec{U1}$ is directly opposite to the velocity vector $\vec{U}$ of rotation of the wheel 202. Thus, in a fixed datum-point, the sum of the vector $\vec{V1}$ and the vector $\vec{U}$ directly gives the vector $\vec{C1}$ which is principally output.

Regarding the third configuration, the velocity of the water leaving the runner 208 in a movable datum-point linked to the wheel is noted as $\vec{V2}$. The velocity is oriented along the direction of flow $D208_2$ defined by the rectilinear extension of the chord 2088. The direction $D208_2$ is analogous to the direction D208' for the runner 208' in FIG. 9. In a fixed datum-point, the velocity of rotation $\vec{U}$ of the wheel 202 is added to the relative velocity vector $\vec{V2}$. The result is an absolute velocity vector $\vec{C2}$ which is also principally output. The third configuration corresponds to the configuration of the runner in FIG. 9 as the turbine is fed at an optimum operating flow rate.

Thus, the elastic deformation of the second part 208B of the runner 208 allows a flow to be obtained with a principally output direction when leaving the runners 208, for various operating points of the turbine. This allows a good quality of flow leaving the wheel 202 to be preserved.

The deformation of the second part 208B of the runner 208 is facilitated by the fact that the material making up the second part 208B can have a modulus of elasticity which is about twenty times less than that of the material making up the first part 208A. More precisely, the material of the second part 208B of the runner 208 can have a modulus of elasticity of between 0.5 GPa and 200 GPa inclusive, notably equal to 10 GPa, whilst the part 208A is in metal, notably steel.

Figure 5:
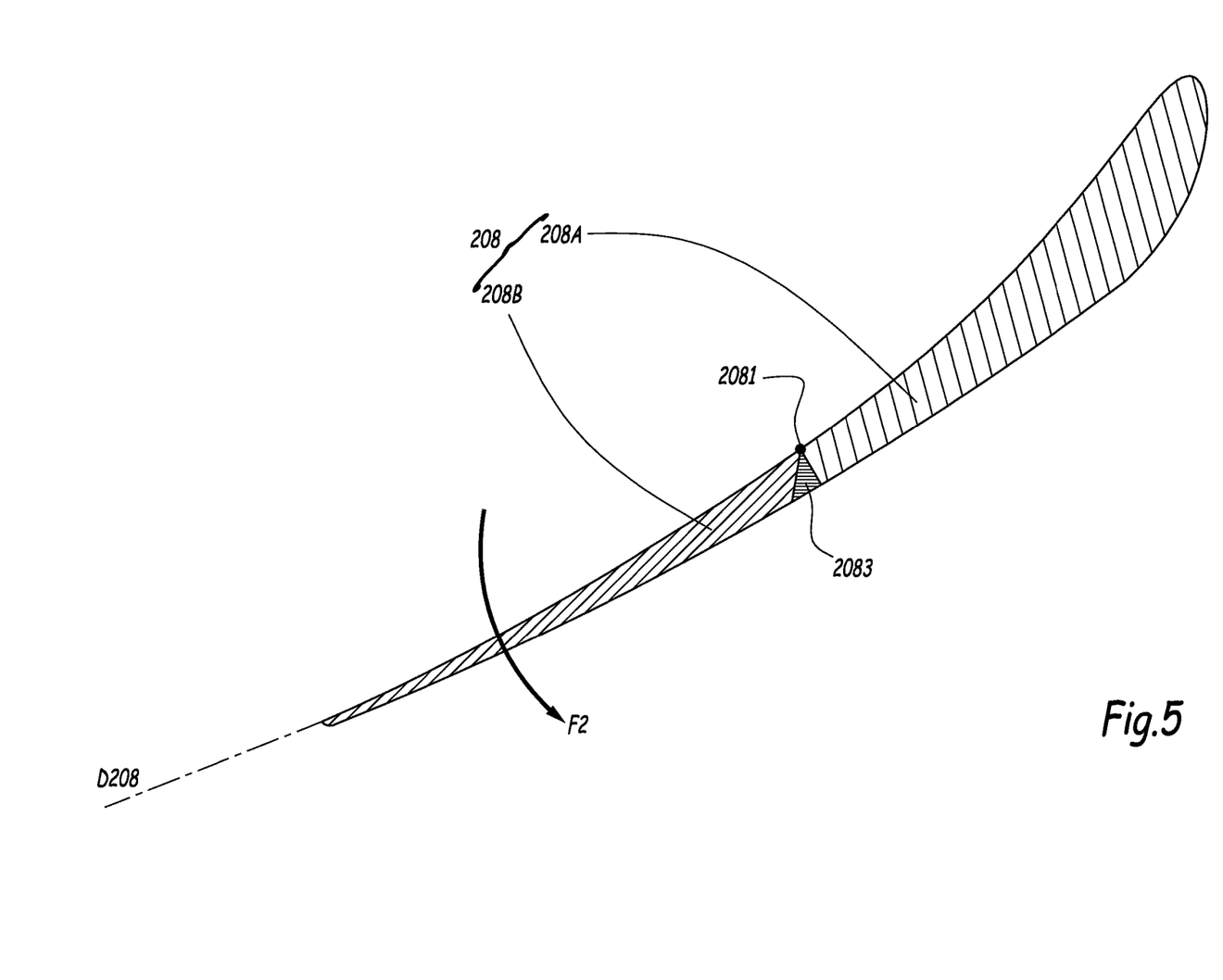
FIG. 5 is a section similar to FIG. 4 of a runner which is associated with a wheel according to a second exemplary embodiment.

FIG. 5 shows a second embodiment of the disclosure. As for the runner in FIG. 13, the extension of the chord 2088 downstream of the trailing edge 2082 defines the direction D208 of the flow E leaving the runner 208. The second embodiment differs from the first in that the second part 208B is articulated on the first part 208A by means of a hinge 2081. Furthermore, the second part 208B is realized in a rigid material, notably in steel and is not fixed, either to the band 2020 or to the crown 2022 of the wheel 202. A corner 2083 in elastomer is arranged between the first part 208A and the second part 208B. When the water passes within the wheel, the second part 208B of the runner 208 is displaced, under the effect of the hydraulic pressure, in the direction of the arrow F2 in FIG. 5. The displacement involves the compression of the corner 2083. The corner 2083 therefore holds the second part 208B of the runner 208 in its movement. Thus, the second part 208B of the runner 208 is suited to define the direction D208 of the flow of water leaving the runner 208, by adapting its position with respect to the part 208A, thanks to elastic compression of the corner 2083.

When the operating flow of the turbine is reduced or when the turbine stops operating, the corner 2083 relaxes in order to recover its initial form and therefore pushes the second part 208B in a direction opposite to the arrow F2 in FIG. 5. The second part 208B of the runner 208 is therefore displaceable, as a result of the corner 2083 and elastically with respect to the first part 208A, to a predetermined position. The predetermined position is not shown in FIG. 5 but corresponds to the case where the second part 208B in practice is above its position in FIG. 5 in a manner similar to the first position of the runner 208 in FIG. 4.

Figure 6:
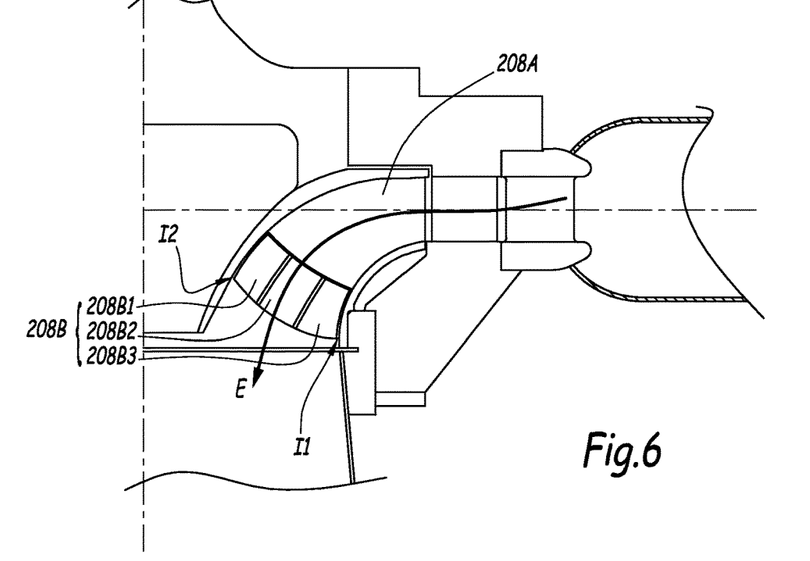
FIG. 6 is a section, similar to the right-hand part of FIG. 1 and in a larger scale, of an installation according to the a third exemplary embodiment

A third embodiment is shown in FIG. 6. The third embodiment differs from the first insofar as the second part 208B of the runner 208 is formed by several separate elements 208B1, 208B2 and 208B3. The elements 208B1, 208B2, 208B3 can be elastically deformable independently of one another with respect to the first part 208A. As can be seen in the figure, the elements 208B1 and 208B3 are not fixed to the crown 2022 and to the band 2020 respectively, allowing an interstice I1 to remain between the element 208B1 and the crown 2022 and an interstice I2 between the element 208B3 and the band 2020. The size of the interstices I1 and I2 is exaggerated in order to facilitate the visualization thereof.

In another exemplary embodiment that is not shown, the second part 208B is formed by a number of elements that is different to three.

In another exemplary embodiment that is not shown, the elements 208B1, 208B2 and 208B3 can be articulated on the first part 208A independently of one another.

Figure 7:
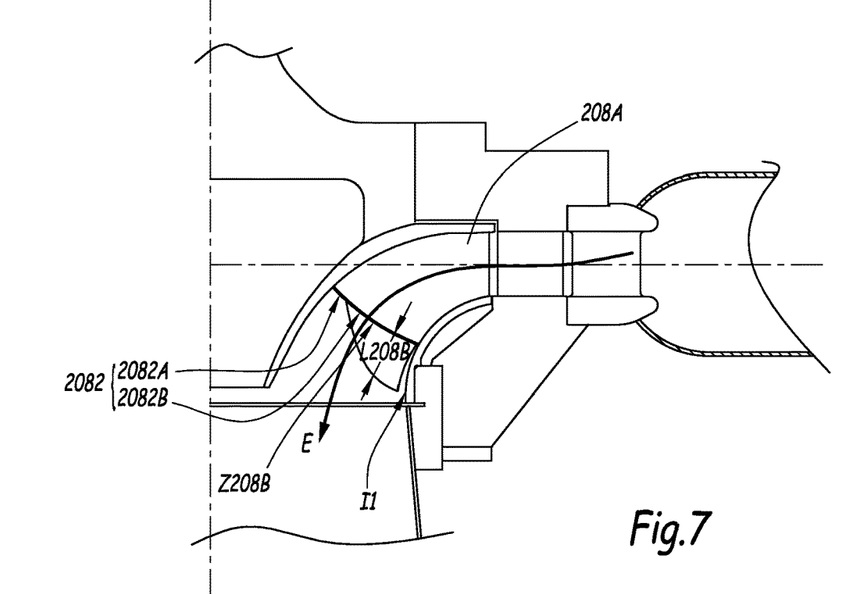
FIG. 7 is a view similar to FIG. 6, of an installation according to a fourth exemplary embodiment.

FIG. 7 shows a fourth embodiment. In this fourth embodiment, the area of attachment of the second part 208B of the runner 208 to the first part 208A is given the reference Z208B and the length of the second part 208B measured between the attachment area Z208B and the trailing edge 2082 is given the reference L208B. In this fourth embodiment, the length L208B is variable along the trailing edge 2082. Furthermore, the second part 2080 only extends over a portion of the trailing edge 2082. Thus, the first part 208A defines a first portion 2082A of the trailing edge 2082 and the second part 208B defines a second portion 2082B of the trailing edge 2082. The second part 208B is not fixed to the crown 2022 or to the band 2020, allowing an interstice I2 to remain between the second part 208B and the band 2020. The size of the interstice I2 is exaggerated in order to facilitate the visualization thereof.

As a variant, the second part 208B can define the totality of the trailing edge 2082, whilst having a variable length L208B.

Figure 3:
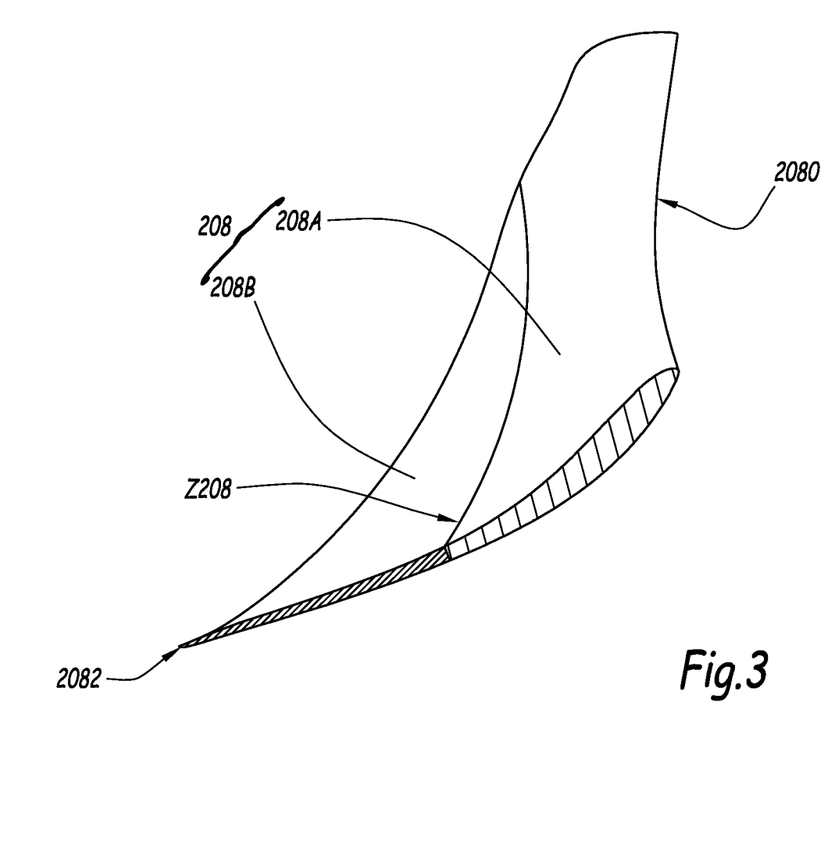
FIG. 3 is a view of the detail of a runner which is associated with the wheel of FIG. 2, namely the fifth runner visible from the left on the figure.
Figures 8, 9:
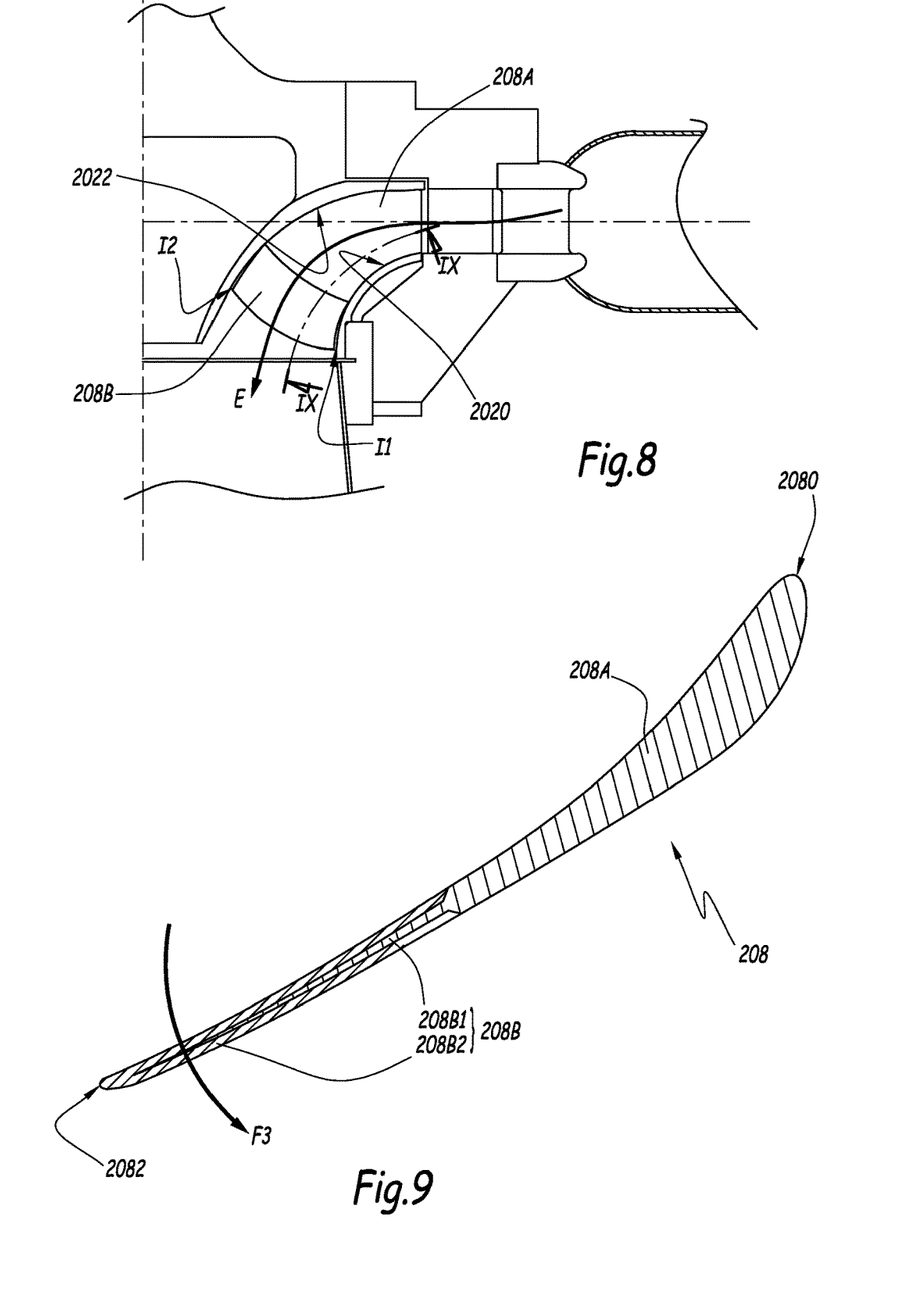
FIG. 8 is a view similar to FIGS. 6 and 7, of an installation according to a fifth exemplary embodiment.
FIG. 9 is a section of a runner along the line IX-IX in FIG. 8.

FIGS. 8 and 9 show a fifth embodiment. In the fifth embodiment, the second part 208B of the runner 208 is formed by, on the one hand, a core in a rigid material which is monobloc with the first part 208A and, on the other hand, by a covering realized in an elastically deformable material, the modulus of elasticity of which is about 400 times less than that of the material making up the first part 208A of the runner 208. The rigid core 208B2 is thinned down compared to the first part 208A such that it is able to be deformed elastically. The covering 208B1 covers the rigid core 208B2 and defines the trailing edge 2082 of the runner 208. The covering 208B1 is realized in a material that is elastically deformable within the range of the water pressure traversing the wheel 202. This can be a composite material, notably polyester and carbon fiber-based. The covering 208B1 is fixed to the rigid core 208B2 and to the first part 208A by gluing. The covering 208B1 is fixed in the extension of the lower surface and of the upper surface of the first part 208A. Thus, this latter ensures the continuity of the flow along the runner 208. Analogously to the preceding embodiments, the second part 208B is not fixed, either to the band 2020 or to the crown 2022 and, when the turbine 20 is fed, deforms elastically following a rotational movement with respect to the first part 208A. The movement is shown in FIG. 3 by an arrow F3.

In the example shown, the covering 208B1 surrounds the rigid core 208B2. In another exemplary embodiment, the covering 208B1 is arranged solely in the top part or in the bottom part of the rigid core 208B2.

According to another variant, the core 208B2 is fixed to the first part 208A by soldering.

Figure 10:
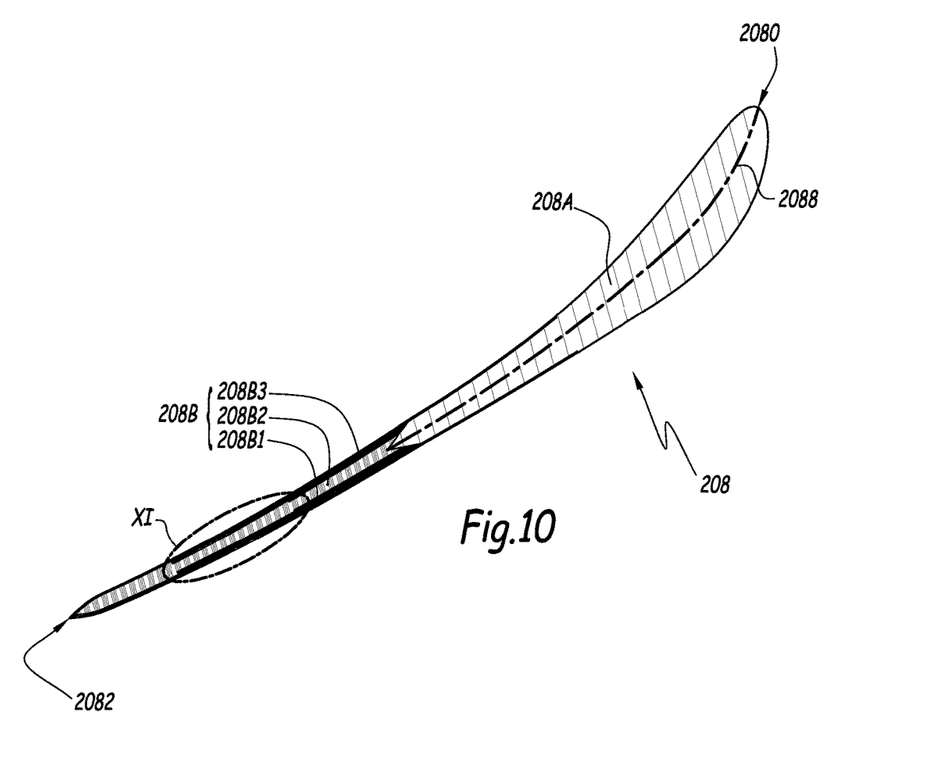
FIG. 10 is a section similar to FIG. 4 of a runner which is associated with a sixth exemplary embodiment.
Figure 11:
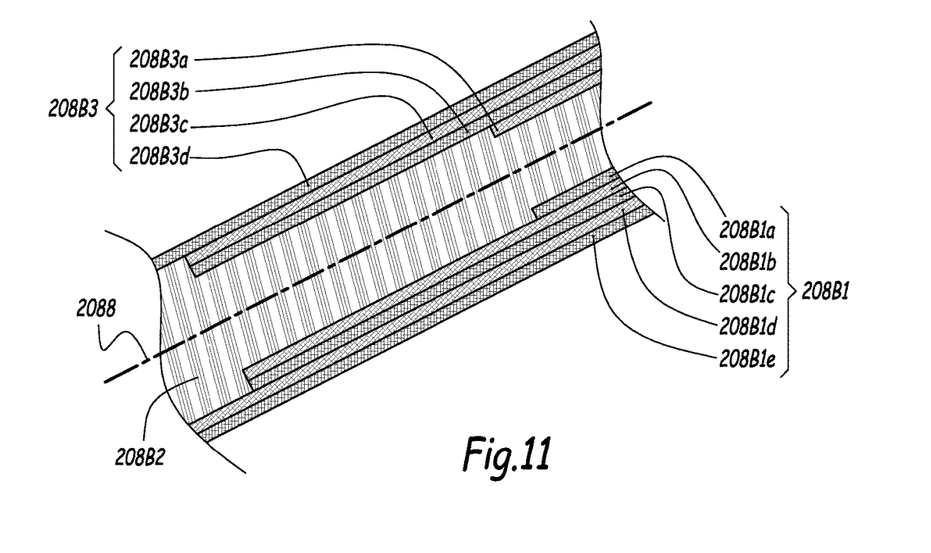
FIG. 11 is a view of the detail of the encircled part XI in FIG. 10.

FIGS. 10 and 11 show a sixth embodiment. In the sixth embodiment, the second part 208B of the runner 208 is formed, on the one hand, by a profile 208B2 in resin which is fixed to the first part 208A of the runner 208 by gluing and, on the other hand, by a shell which surrounds the profile in resin 208B2 and defines the trailing edge 2082 of the runner 208. The shell includes a first portion 208B1 which is arranged on the side of the upper surface and a second portion 208B3 which is arranged on the side of the lower surface of the runner 208.

As can be seen in FIG. 11, the first portion 208B1 and the second portion 208B3 of the shell can be realized in a stratified composite material, notably by superposing different layers in glass fiber and epoxy resin. The first portion 208B1 of the shell includes five layers which can be superposed along a direction that is perpendicular overall to the chord 2088 of the runner 208. The layers of the first portion 208B1 can be given the successive references of 208B1*a*, 208B1*b*, 208B1*c*, 208B1*d* and 208B1*e*, going respectively from the inside layer 208B1 which is placed against the profile in epoxy resin 208B2 to the outer layer 208B1*e*. In the same way, the second portion 208B3 of the shell includes four layers which can be superposed along a direction perpendicular to the chord 2088 of the runner 208. The successive layers of the second portion 208B3 of the shell can be given the references of 208B3*a*, 208B3*b*, 208B3*c* and 208B3*d*, going from the innermost layer 208B3*a* which is placed against the profile in epoxy resin 208B2 to the outer layer 208B3*d*. The portions 208B1 and 208B3 of the shell have a variable thickness between the first part 208A and the trailing edge 2082. More precisely, the thickness of the shell reduces as the trailing edge 2082 is approached. The length of covering of one layer of the shell is all the weaker given that the layer in question is close to the profile in resin 208B2. A gradually reduced superposition is obtained in the direction of the length. In other words, the shell does not include the same number of folds over the entire length of the runner 208. The portion 208B1 of the second part 208B includes an area of five layers, an area of four layers and an area of two layers whilst the second portion 208B3 includes an area of four layers, an area of three layers and an area with one single layer.

In an analogous manner to the five first embodiments, the second part 208B of the runner 208 is elastically deformable so as to adapt the best to the operating point of the turbine. The advantage of using a composite material for the shell of the second part 208B is that it bestows it with good mechanical strength.

In another exemplary embodiment that is not shown specific to the sixth embodiment, the arrangement and the number of layers within the shell can be different.

In another exemplary embodiment not shown that is applicable to the six first embodiments, the second part 208B of the runners 208 is fixed to the crown 2022 and/or to the band 2020.

Figure 12:
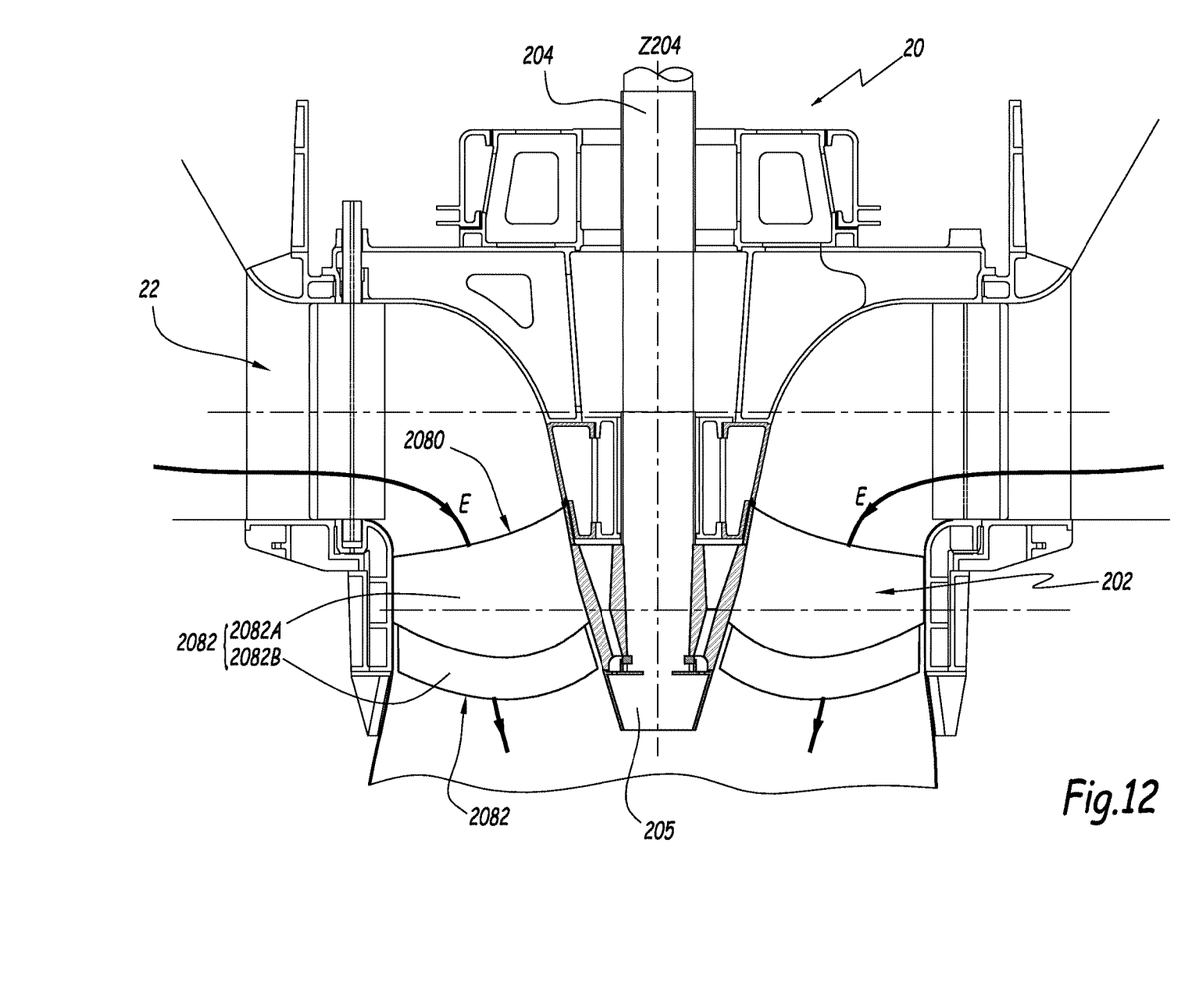
FIG. 12 is a basic axial section of an installation according to an exemplary embodiment which incorporates a propeller-type turbine according to a seventh exemplary embodiment.

FIG. 12 shows another type of hydraulic machine to which a seventh embodiment is applied. The hydraulic machine is a propeller-type turbine. It includes a hub 205 mounted on a shaft 204 rotating about a vertical axis of rotation Z204. Runners 208 which can be sometimes called blades can be arranged around the hub 205. The propeller turbine is fed with water through a penstock 22. The water therefore travels between the runners 208 of the propeller. The flow is shown in FIG. 12 by the arrows E. The hub 205 and the runners or blades 208 together define the rotating part 202 of the turbine.

The runners 208 of the propeller turbine can be realized in two parts. A first part 208A defines the leading edge 2080 of each runner when seen through the flow E and is integral with the hub 205. A second part 208B defines the trailing edge 2082 of each runner when seen through the flow E. The part 208B is attached to the first part 208A but is not integral with the hub 205. The second part 208B is realized in an elastically deformable material. Thus, as the flow E passes, the second part 208B of the runners 208 is deformed in order to define the direction of the flow E of water downstream of the runner 208. More precisely, the deformation of the second part 208B of the runner 208 allows the water, leaving the runner 208, to be directed along a direction parallel to the axis Z204 of rotation of the hub 205 and of the shaft 204. This is also called an output direction. The flow leaving the runners or the blades 208 is therefore stable.

In a variant that is not shown that is applicable to the seventh embodiment, the second part 208B of the runner 208 is not integral with the hub 205.

In a variant that is not shown of the embodiment in FIG. 12, the second part 208B of the runner 208 is articulated on the first part 208A. In this case, the second part 208B is realized in a rigid material, similar to the material making up the first part 208A.

According to another variant that is not shown of the embodiment in FIG. 12, the second part 208B of the runners or blades 208 is integral with the hub 205.

In a variant that is not shown that is applicable to the first, third, fourth and sixth embodiments, the first part 208A and the second part 208B can be glued or screw-connected together.

In a variant is not shown, the axis of rotation Z202 of the wheel is horizontal.

Exemplary embodiments are also applicable to Bulbe-type, Kaplan-type or Deriaz-type turbines.

The variants and embodiments above can be combine to give new embodiments as well.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A rotating part of a hydraulic machine which, when it is traversed by a flow of water, rotates around an axis of rotation and which comprises:
    runners which are distributed around the axis of rotation and each extend between a leading edge and a trailing edge, wherein each runner includes:
        a first part which defines its leading edge; and
        a second part which is attached to the first part and defines its entire trailing edge, the second part defining, when the machine operates, a direction of flow of water downstream of the runner;
    wherein the second part is configured on the first part so as to be automatically and passively deformable or displaceable from an at-rest position in a reversible direction relative to the first part as a result of increasing hydraulic pressure exerted on the runner, and wherein the second part automatically and passively returns towards the at-rest position as the hydraulic pressure exerted on the runner decreases,
    wherein the runners have an asymmetrical profile,
    wherein the second part of the runner is articulated on the first part by a hinge, and
    wherein the runner further comprises a corner arranged at least partially between the first part and the second part for elastically returning the second part towards the at-rest position as the hydraulic pressure exerted on the runner decreases.

2. The rotating part as claimed in claim 1, wherein said rotating part comprises: a connecting member between the runners and a shaft which defines the axis of rotation of the rotating part, the first part of each runner being integral with the connecting member and the second part of each runner not being integral with the connecting member.

3. The rotating part as claimed in claim 1, wherein the second part extends over about a third of the length of the runner, measured between the leading edge and the trailing edge.

4. The rotating part as claimed in claim 1, wherein the second part of the runner is formed by several separate elements which are elastically deformable or displaceable independently of one another with respect to the first part.

5. The rotating part as claimed in claim 1, wherein the length of the second part measured between its area of attachment to the first part and the trailing edge is variable along the trailing edge.

6. The rotating part as claimed in claim 1, wherein when the machine operates, the second part directs the flow of water along a direction which has a reduced rotational component approaching from a direction parallel to the axis of rotation of the rotating part.

7. The rotating part as claimed in claim 1, wherein said rotating part is a Francis turbine wheel which comprises: a crown and a band between which the runners extend the first part of each runner being fixed to the crown and to the band, and the second part being fixed or not fixed to the crown or to the band.

8. The rotating part as claimed in claim 1, wherein said rotating part is associated with a propeller-type, Kaplan-type, Bulbe-type or Deriaz-type turbine and comprises: a hub and runners which extend, radially with respect to the axis of rotation, from the hub, the first part of each runner being mounted on the hub and the second part of each runner being fixed or not fixed on the hub.

9. A hydraulic machine, wherein said hydraulic machine comprises: a rotating part as claimed in claim 1.

10. An installation for converting hydraulic energy into electric energy or mechanical energy, wherein said installation comprises: a hydraulic machine as claimed in claim 9.

11. The rotating part as claimed in claim 1, wherein each runner extends between a lower surface and an upper surface, the hydraulic pressure being primarily exerted on the lower surface of the runner, the hinge being positioned at or adjacent to the lower surface of the runner.

12. The rotating part as claimed in claim 1, wherein each runner extends between a lower surface and an upper surface, the hydraulic pressure being primarily exerted on the lower surface of the runner, the corner extending between a lower end positioned adjacent to the lower surface of the runner and an upper end positioned adjacent to the upper surface of the runner, the corner having a constantly increasing thickness from the lower end to the upper end.

13. A rotating part of a hydraulic machine which, when it is traversed by a flow of water, rotates around an axis of rotation and which comprises:
    runners which are distributed around the axis of rotation and each extend between a leading edge and a trailing edge, wherein each runner includes:
        a first part which defines its leading edge; and
        a second part which is attached to the first part and defines its entire trailing edge, the second part defining, when the machine operates, a direction of flow of water downstream of the runner;
    wherein the second part is configured on the first part so as to be automatically and passively deformable or displaceable from an at-rest position in a reversible direction relative to the first part as a result of increasing hydraulic pressure exerted on the runner, and wherein the second part automatically and passively returns towards the at-rest position as the hydraulic pressure exerted on the runner decreases,
    wherein the second part of the runner is articulated on the first part by a hinge, and
    wherein the runner further comprises a corner arranged at least partially between the first part and the second part for elastically returning the second part towards the at-rest position as the hydraulic pressure exerted on the runner decreases.

* * * * *